(12) United States Patent
Kemper

(10) Patent No.: US 7,575,126 B2
(45) Date of Patent: Aug. 18, 2009

(54) LEAK RESISTANT DRINKING CUP

(75) Inventor: Bernard J. Kemper, Bonne Terre, MO (US)

(73) Assignee: Handi-Craft Company, St. Louis, MO (US)

( * ) Notice: Subject to any disclaimer, the term of this patent is extended or adjusted under 35 U.S.C. 154(b) by 607 days.

(21) Appl. No.: 11/046,288

(22) Filed: Jan. 28, 2005

(65) Prior Publication Data

US 2006/0169694 A1 Aug. 3, 2006

(51) Int. Cl.
*A47G 19/22* (2006.01)
*B65D 51/16* (2006.01)

(52) U.S. Cl. .................. 220/714; 220/717; 220/203.11; 220/303

(58) Field of Classification Search .................. 220/714, 220/717, 203.11, 710.5, 303
See application file for complete search history.

(56) References Cited

U.S. PATENT DOCUMENTS

| | | | |
|---|---|---|---|
| 3,915,331 A | 10/1975 | Chenault | |
| 4,623,069 A | 11/1986 | White | |
| 4,993,568 A | 2/1991 | Morifuji et al. | |
| 5,071,017 A | 12/1991 | Stull | |
| 5,101,991 A | 4/1992 | Morifuji et al. | |
| 5,101,992 A | 4/1992 | Serre | |
| 5,542,670 A | 8/1996 | Morano | |
| 5,570,796 A | 11/1996 | Brown et al. | |
| 5,598,809 A | 2/1997 | McInnes | |
| 5,667,084 A | 9/1997 | Duggal et al. | |
| 5,690,679 A | 11/1997 | Prentiss | |
| 5,706,973 A | 1/1998 | Robbins, III et al. | |
| 5,747,083 A | 5/1998 | Raymond et al. | |
| 5,779,071 A | 7/1998 | Brown et al. | |
| 5,791,503 A | 8/1998 | Lyons | |
| 5,890,619 A | 4/1999 | Belanger | |
| 5,890,620 A | 4/1999 | Belcastro | |
| 5,890,621 A | 4/1999 | Bachman et al. | |
| 5,950,857 A * | 9/1999 | Rosen ..................... 220/23.91 |
| 6,037,872 A * | 3/2000 | Dunnum .................... 340/586 |
| 6,050,445 A | 4/2000 | Manganiello | |
| 6,079,589 A | 6/2000 | Matsuyama et al. | |
| D429,312 S | 8/2000 | Poirier et al. | |
| 6,102,244 A | 8/2000 | Kuwano et al. | |
| 6,102,245 A | 8/2000 | Haberman | |
| D433,729 S | 11/2000 | Poirier et al. | |
| 6,202,877 B1 | 3/2001 | La Torre et al. | |
| 6,230,923 B1 | 5/2001 | Hung | |
| 6,260,731 B1 | 7/2001 | Cummings | |
| 6,269,968 B1 | 8/2001 | Belcastro | |
| D448,242 S | 9/2001 | McDonough et al. | |
| D448,976 S | 10/2001 | McDonough et al. | |
| 6,305,570 B1 | 10/2001 | Atkin et al. | |
| D450,535 S | 11/2001 | McDonough et al. | |

(Continued)

*Primary Examiner*—Anthony D Stashick
*Assistant Examiner*—James N Smalley
(74) *Attorney, Agent, or Firm*—Armstrong Teasdale, LLP

(57) ABSTRACT

A leak resistant drinking cup has a diaphragm seal for normally closing an open top of a liquid container of the cup. The seal can be opened to permit liquid to flow past it and out of the cup upon application of a vacuum pressure by the person, typically a small child, drinking from the cup. The diaphragm seal has a peripheral edge margin that can be deflected upward by the vacuum pressure to open a path out of the drinking cup. A hold down rib may be employed to control the locations where the peripheral edge margin is permitted to deflect.

23 Claims, 14 Drawing Sheets

U.S. PATENT DOCUMENTS

| | | |
|---|---|---|
| 6,321,931 B1 | 11/2001 | Hakim et al. |
| 6,325,236 B1 | 12/2001 | Wong |
| 6,357,620 B1 | 3/2002 | Hakim |
| 6,365,202 B1 | 4/2002 | Ida et al. |
| 6,422,415 B1 | 7/2002 | Manganiello |
| 6,502,418 B2 | 1/2003 | Holley, Jr. |
| 6,508,379 B1 * | 1/2003 | Van De Pol-Klein Nagelvoort et al. .................. 220/714 |
| 6,565,743 B1 | 5/2003 | Poirier et al. |
| 6,568,557 B2 | 5/2003 | Fusco et al. |
| 6,607,092 B2 | 8/2003 | Manganiello et al. |
| 6,609,630 B1 | 8/2003 | Freeman et al. |
| 6,629,624 B2 | 10/2003 | Stillinger et al. |
| 6,631,823 B2 | 10/2003 | Stillinger et al. |
| 6,631,832 B2 | 10/2003 | Wan et al. |
| 6,644,510 B2 | 11/2003 | Kawolics et al. |
| 6,685,042 B2 | 2/2004 | McIntyre et al. |
| 6,732,882 B2 | 5/2004 | Belcastro |
| 6,758,364 B1 | 7/2004 | Röhrig |
| 6,783,020 B2 | 8/2004 | Featherston et al. |
| 6,786,352 B2 | 9/2004 | Belcastro |
| 2001/0020623 A1 | 9/2001 | McDonough et al. |
| 2001/0027956 A1 | 10/2001 | Bonacorso et al. |
| 2001/0035420 A1 * | 11/2001 | Fusco et al. .................. 220/714 |
| 2002/0033399 A1 | 3/2002 | Manganiello et al. |
| 2003/0209555 A1 | 11/2003 | Belcastro |
| 2004/0222229 A1 * | 11/2004 | Gabbard .................. 220/705 |
| 2005/0045647 A1 * | 3/2005 | Hession et al. .............. 220/714 |

\* cited by examiner

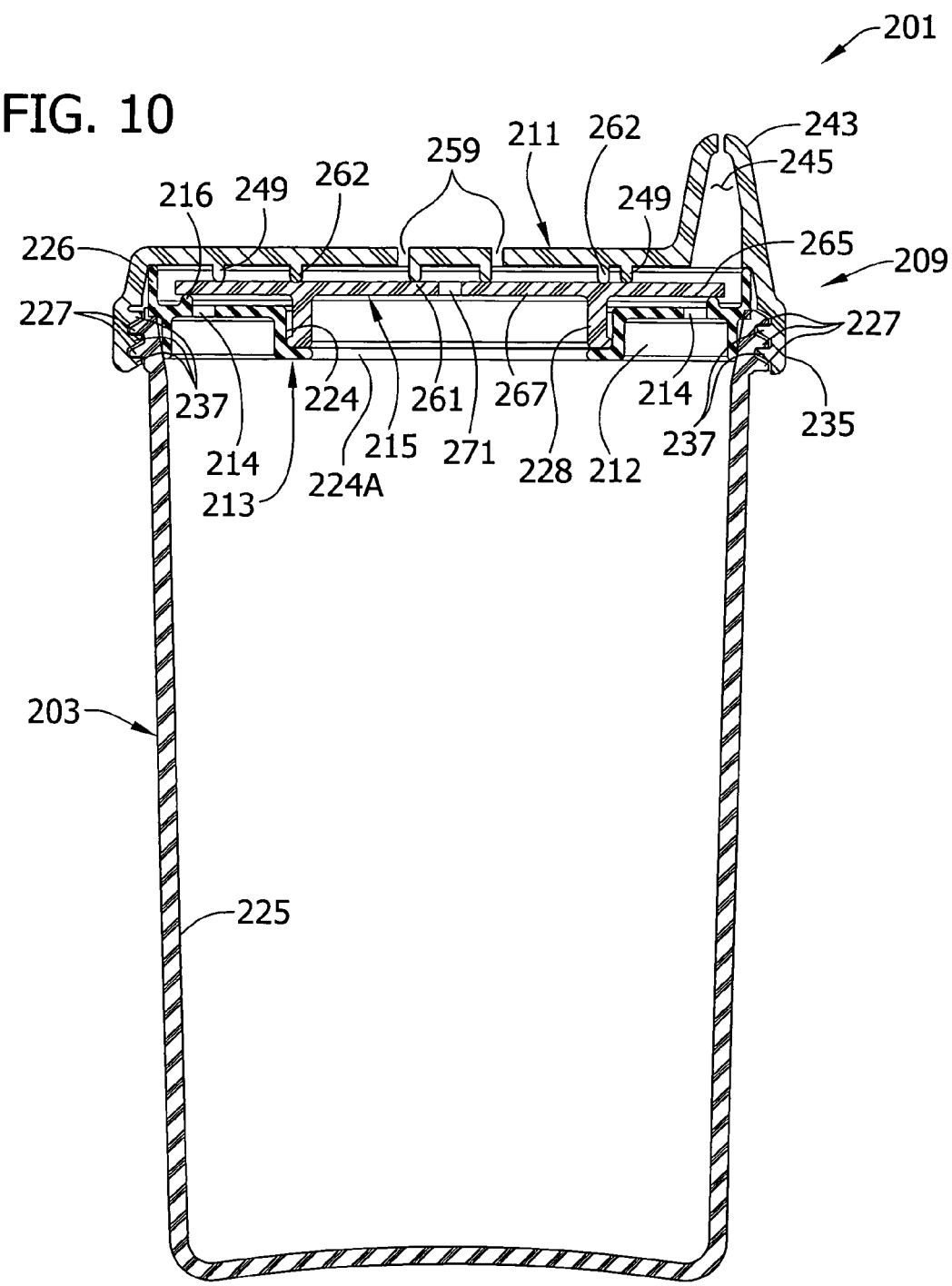

LEAK RESISTANT DRINKING CUP

BACKGROUND OF THE INVENTION

This invention relates generally to leak resistant vessels and more particularly to vessels which permit, in a controlled manner, passage of liquid out of the vessel upon demand.

Vessels of the type to which the present invention relates are most commonly in the form of drinking cups used for small children. The cups are configured so that if they are turned over, liquid inside the cup is prevented from spilling out of the cup by a valve arrangement that seals the cup when not used. Usually the cup has a relatively rigid cover formed with a spout that the child puts his lips on to drink from the cup. The cover can be releasably attached (e.g., snapped or screwed on) to a container portion of the cup over an open top of the container portion, to close the open top. The valve is arranged between the cover and the container portion can be opened to allow liquid to pass out of the cup for drinking. Most commonly, the valve is actuated by a vacuum pressure applied by the user to the interior of the cup by sucking on a spout or other opening in a cover of the cup. The vacuum pressure so applied causes the valve to move or deform in such a way that a path past the valve is exposed so liquid can flow out of the cup. It is possible that the valve might be actuated in other ways, such as a purely mechanical actuation, but for small children vacuum pressure actuation is most preferable because the only time the valve is open is when the child in the act of taking a drink.

Vacuum pressure actuated drinking cups of the type just described have certain problems generally associated with balancing the need to assure positive sealing with the need to make the cup easy to use for the child. A strong seal by the valve requires a relatively large vacuum to open, making it hard for the child to use. A seal that requires a lower vacuum pressure to open may not seal tightly enough to prevent at least some liquid flowing past it. Frequently, the valve is relatively small and located under the spout. The small size of the valve requires a substantial vacuum pressure to actuate because the pressure acts on only a relatively small area. In other words, children will have to suck with significant effort to get the valve to open. That makes the cup less desirable to the child. It is also important to reduce the opportunity for the child to suck in air when drinking from the cup. This may occur when the level of liquid in the cup is low. If the opening covered by the valve is relatively small, the problem is minimized. However if the valve is also small in surface area, this can lead to difficulty in opening the valve, as previously described.

Conventionally, the valve may be permanently attached to the cover so that the valve will always remain in tact. However, in use the valve will necessarily become fouled with drink liquid and particulates in the liquid. Although cleaning is possible, it is very difficult to clean the entire valve or the entire cover. Disassembly of the valve from the cover would result in destruction of the valve (or cover). Therefore, it is difficult to make certain that the valve and cover remain clean in repeated use. It is known to provide valves that can be disassembled from the cover for cleaning. However, these valves may be difficult to detach and reassemble. Moreover, small valves may become lost or damaged.

SUMMARY OF THE INVENTION

In one aspect of the present invention, a leak resistant drinking cup generally comprises a container sized and shaped for receiving and holding a quantity of liquid for drinking. The container has an open top. A lid assembly includes a cover adapted for removable attachment to the container for closing the open top, the cover having a rigid spout for receiving the drinking liquid through the cover. A flexible diaphragm seal adapted to be disposed between the cover and the open top of the container is able to selectively block the flow of liquid from the container to the spout in the cover. The diaphragm seal has a peripheral edge margin adapted to, as installed between the cover and the container, flex between a closed position in which the diaphragm seal blocks movement of the drinking liquid from the container to the spout of the cover, and an open position in which the diaphragm does not block the drinking liquid flowing from the container to the spout.

In another aspect of the present invention, a leak resistant vessel generally comprises a container sized and shaped for receiving and holding a quantity of liquid. The container has an open top and a central axis. A lid assembly includes a cover adapted for removable attachment to the container, the cover having an opening for receiving the liquid through the cover. A flexible diaphragm seal adapted to be disposed between the cover and the open top of the container is able to selectively block the flow of liquid from the container to the opening in the cover. The diaphragm seal has a peripheral edge margin capable as installed between the cover and the container of flexing between a closed position in which the diaphragm blocks movement of the liquid from the container to the opening of the cover, and an open position in which the diaphragm does not block the liquid flowing from the container to the cover opening. A hold down is sized and shaped for holding down a portion of the diaphragm seal when assembled on the container to hold the diaphragm seal portion against flexing from the closed position to the open position while permitting another portion of the diaphragm seal to flex from the closed position to the open position upon application of a vacuum pressure between the cover and the diaphragm seal.

Other objects and features of the present invention will be in part apparent and in part pointed out hereinafter.

BRIEF DESCRIPTION OF THE DRAWINGS

FIG. 10 is a vertical section of a drinking cup of a third embodiment;

Corresponding reference characters indicate corresponding parts throughout the several views of the drawings.

DETAILED DESCRIPTION

Figure 1:
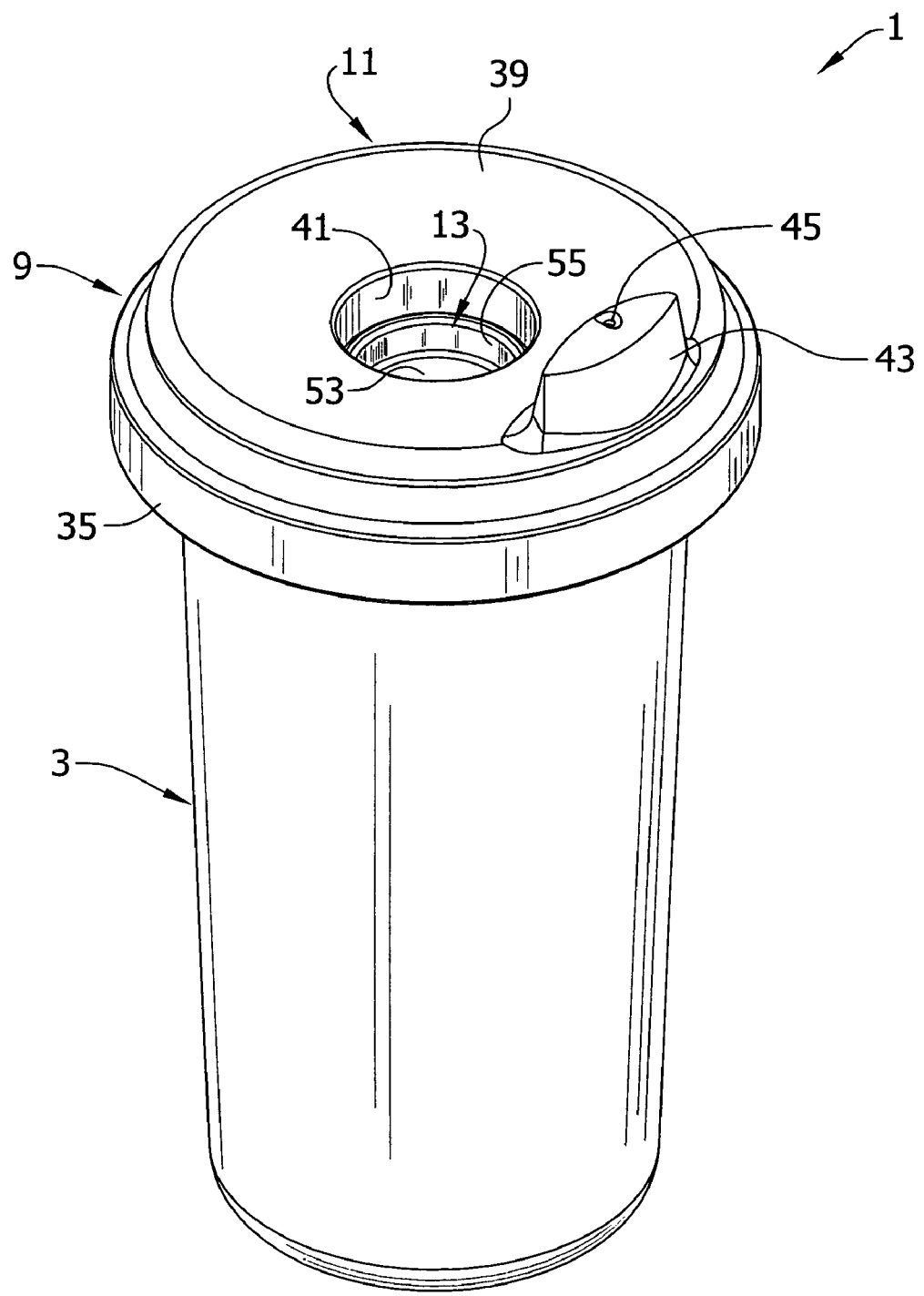
FIG. 1 is a perspective of a leak resistant drinking cup.
Figure 2:
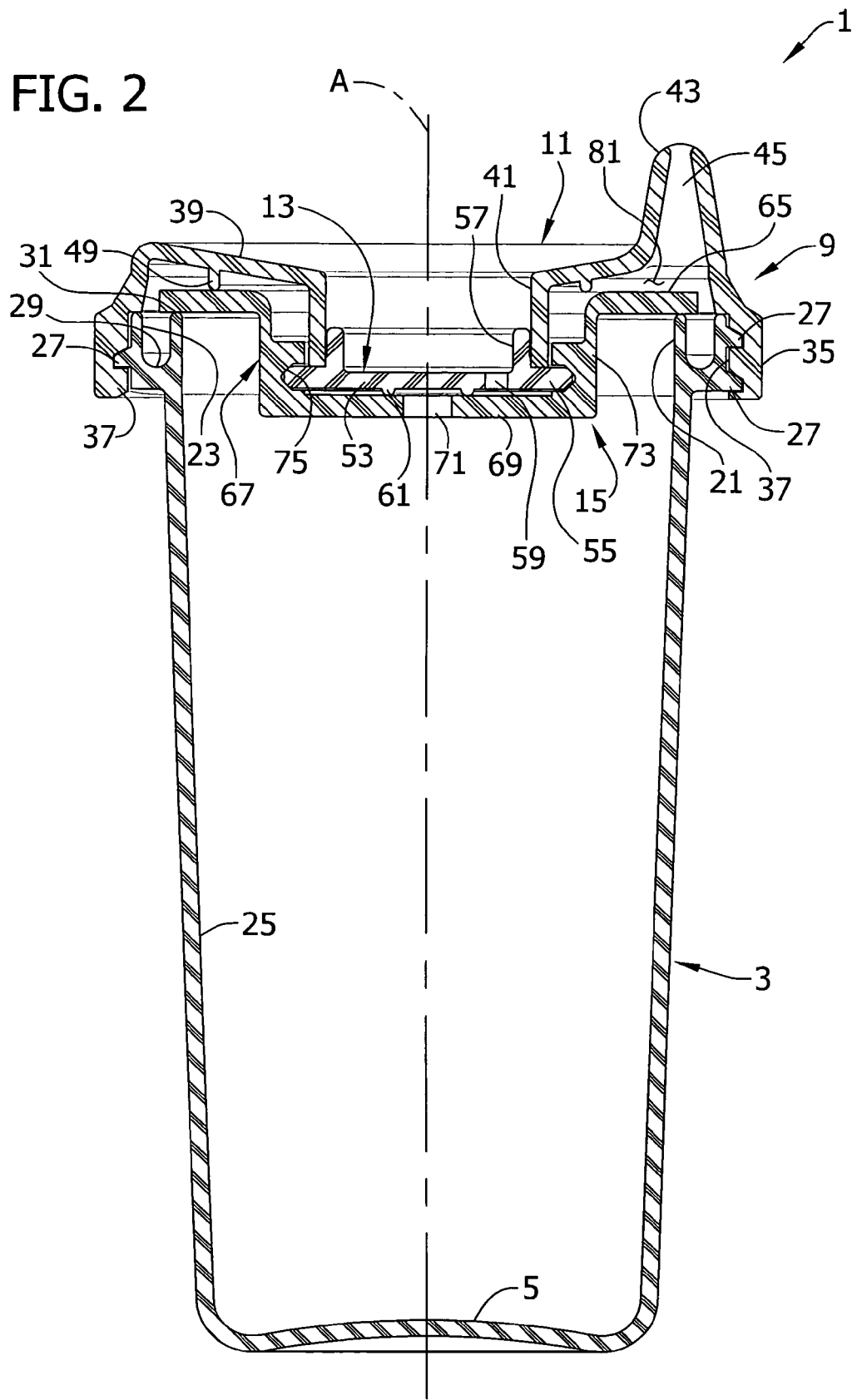
FIG. 2 is an enlarged vertical section of the cup.
Figure 4:
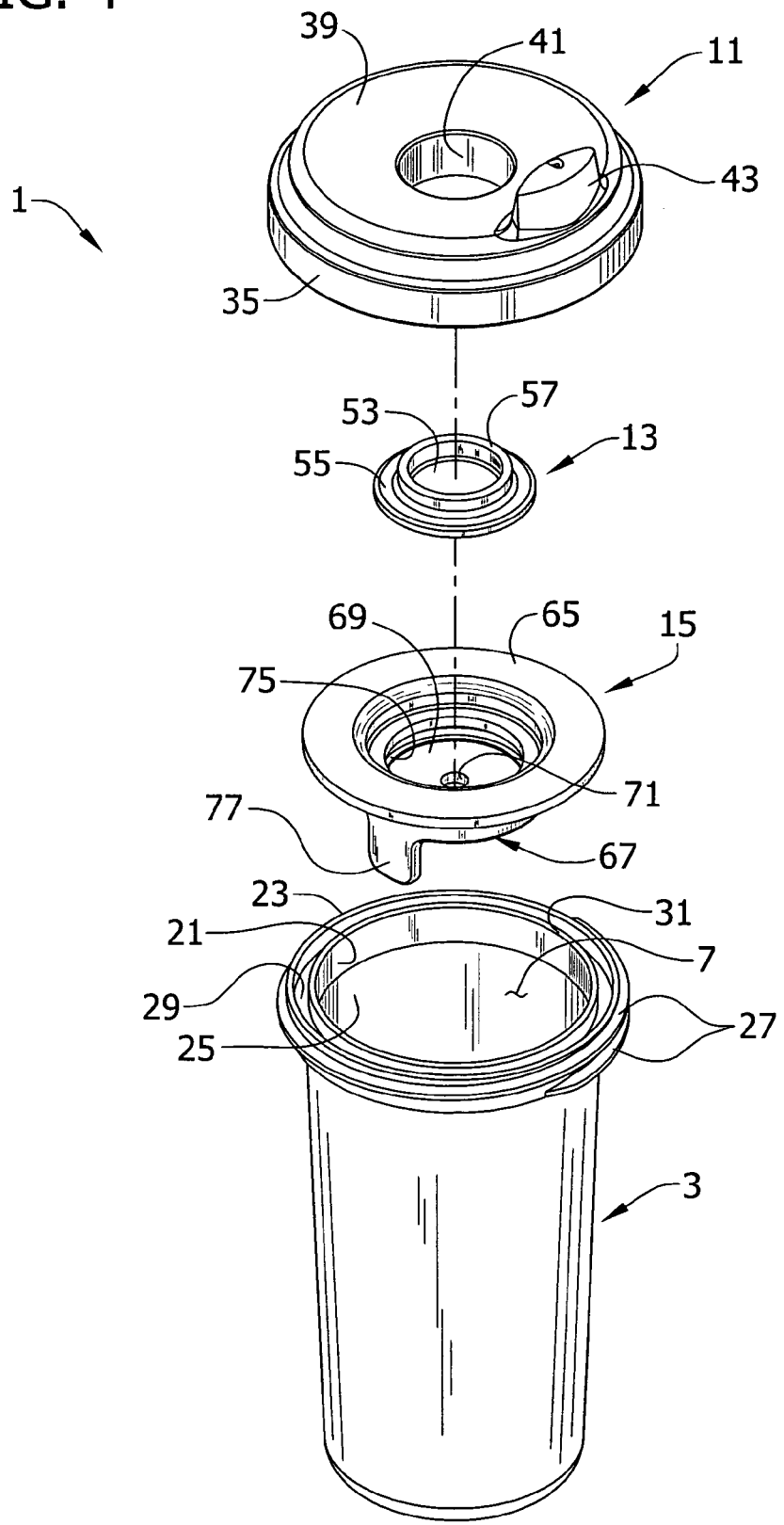
FIG. 4 is an exploded perspective of the cup.

Referring now to the drawings and in particular to FIGS. 1, 2 and 4, a drinking cup of a first embodiment (generally indicated at 1) constructed according to the principles of the present invention is shown to comprise a container (generally indicated at 3) having a closed bottom 5 and an open top 7 for holding a quantity of liquid to be consumed by a user, such as a small child (not shown). A lid assembly 9 comprises a cover 11 and a retainer 13 made of a suitable material such as polypropylene (the reference numbers indicate their subjects generally). A flexible diaphragm seal indicated generally at 15 is disposed between the cover 11 and an interior space of the container 3. The diaphragm seal 15 can be made of silicone or other appropriate material. The cover 11, retainer 13 and diaphragm seal 15 can be made any desired color or colors, and may be transparent or translucent. As described more fully hereinafter, the diaphragm seal 15 is operable to block the flow of liquid from the container 3 to prevent the liquid from being spilled if the cup is tipped over. The diaphragm seal 15 can be deflected or flexed by an application of vacuum pressure to permit liquid in the container 3 to flow past it to the cover 11 and out of the cup. In the most preferred embodiments, the present invention takes the form of a drinking cup for children (e.g., drinking cup 1). However it is to be understood that the principles of the present invention are applicable to cups for older children or adults, and to vessels which may be used for containing something other than consumable liquids.

The container 3 is generally cylindrical in shape and generally symmetrical about a central axis A. It will be appreciated that a container (not shown) may be other than cylindrical and have a central axis. Such a container need not be symmetrical about the central axis within the scope of the present invention. The container 3 has an annular inner rim 21 and an annular outer attachment collar 23 at its upper end. The inner rim 21 forms a smooth continuation of an inner surface 25 of the container 3. The attachment collar 23 has threads 27 formed on an outer surface for use in releasably attaching the cover 11 to the container 3. When attached to the container 3, an upper edge of the collar 23 sealing engages the cover 11. An annular channel 29 in the upper end of the container 3 separates the inner rim 21 from the attachment collar 23 and allows the inner rim to be relatively thin and have a narrow upper edge 31 (see FIG. 4) to facilitate sealing with the diaphragm seal 15, as will be described more fully hereinafter. The container 3 is made of a suitable material, such as polypropylene, and may be of any desired color or colors, and may be transparent or translucent.

Figure 7:
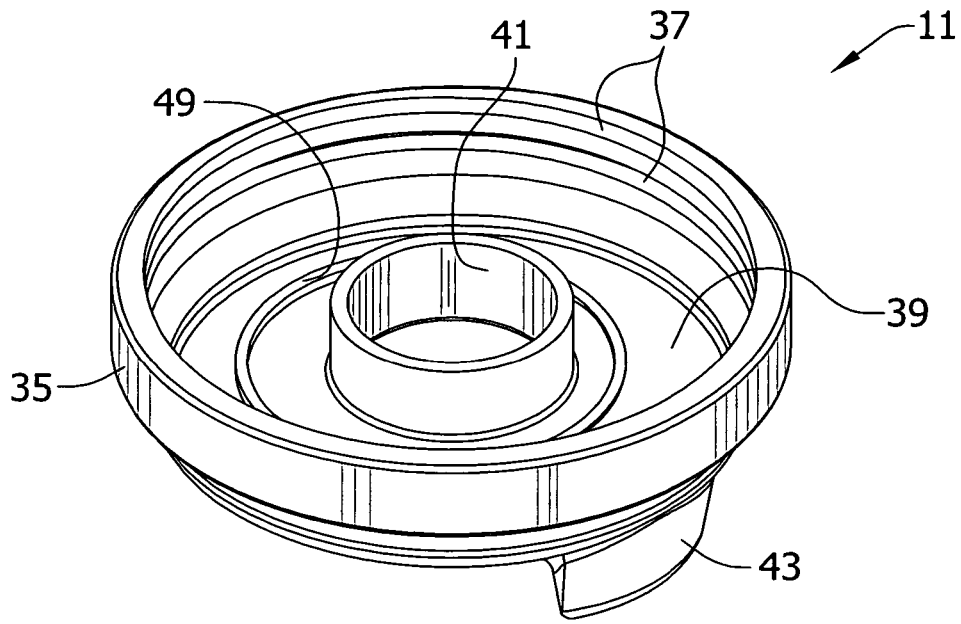
FIG. 7 is a bottom perspective of a cover of the cup.
Figure 7A:
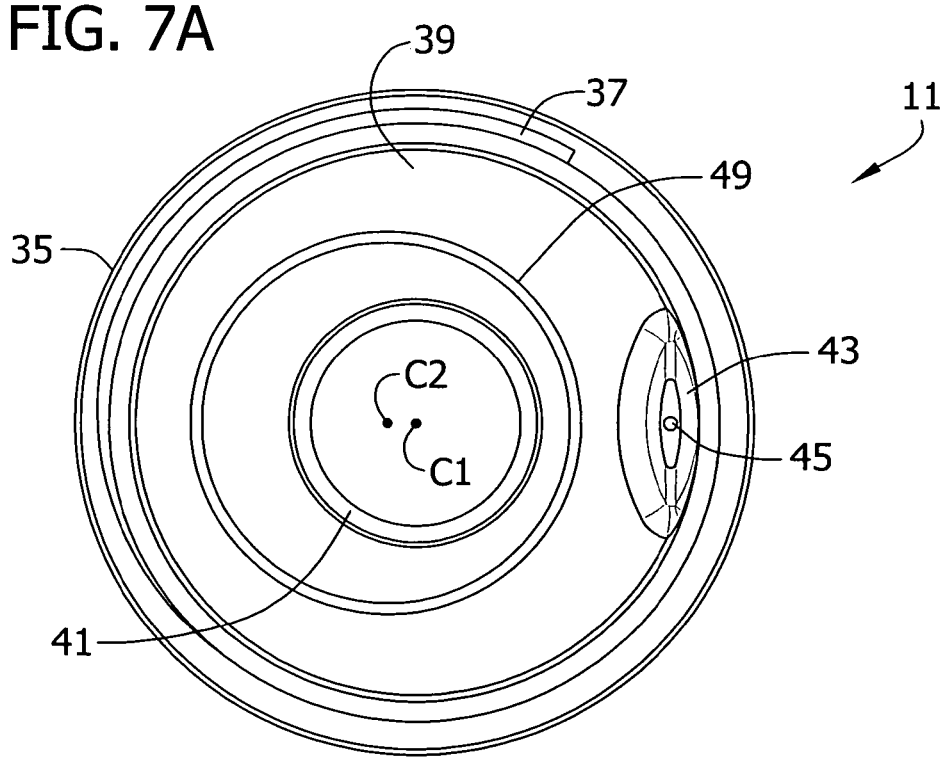
FIG. 7A is a bottom plan of the cover.

The cover 11 of the lid assembly 9 includes a peripheral skirt 35 that has threads 37 on an inwardly facing surface to mate with the threads 27 on the attachment collar 23 of the container 3 (FIG. 2) to allow the cover to be screwed onto and off of the container. Other forms and structures for making a releasable connection between the cover and the container (not shown) may be used without departing from the scope of the present invention. For instance, a cover and container may be constructed to permit a releasable snap-on attachment of the cover to the container. Referring now also to FIGS. 7 and 7A, a shallow conical portion 39 of the cover 11 is located immediately inward of the skirt 35 and surrounds short, tubular center aperture 41 in the cover. The cover 11 also has an upstanding spout 43 that defines an opening 45 through the cover. An opening may be defined by structure other than a spout (e.g., by a simple hole in a cover) within the scope of the present invention. The spout 43 is relatively rigid in the illustrated embodiment, but the spout or even the entire lid assembly 9 may be made to be highly flexible. The spout 43 protrudes upward from the remainder of the cover 11 and provides a structure for the child to place his lips around for sealing his mouth with the spout to apply suction to the drinking cup 1 for taking liquid from the drinking cup. The shape of the cover is preferably suitable for making connection to the container, but may otherwise take on shapes and configurations other than shown in the illustrated embodiments of the present invention.

As best seen in FIGS. 7 and 7A, the underside of the cover 11 is formed with a rib 49 (broadly, a "hold down") that is used for selectively holding down a portion of the diaphragm seal 15, as will be described more fully. The rib 49 depends from a bottom surface of the cover 11 and extends continuously in a ring around a center C1 of the cover. However, the rib 49 is eccentric from the center of the cover 11. A center C2 of the ring formed by the rib 49 is offset so that center C2 and the spout 43 are located on radially opposite sides of the center C1 of the cover 11. Thus, the rib 49 is shifted away from the spout 43 so that more of the rib is on one side of the cover 11 (away from the spout) than the other, for reasons that will be set forth hereinafter. Although the rib 49 is continuous and formed as one piece of material with the cover 11, a hold down (not shown) could be formed as a separate piece, and/or could be made up of multiple separate pieces between the cover and diaphragm seal 15 without departing from the scope of the present invention. Moreover, in addition to or instead of the rib 49 being eccentrically arranged on the cover 11, the rib could be reduced in height on the side nearest the spout 43.

Figure 6:
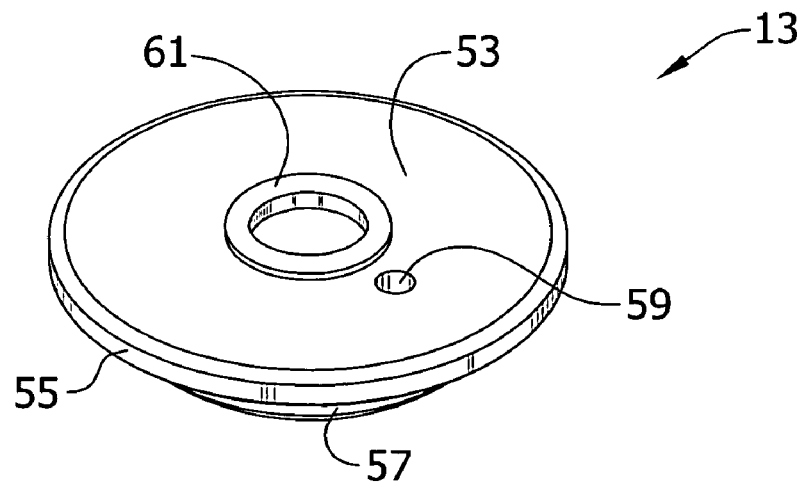
FIG. 6 is a bottom perspective of a retainer of the cup.

The retainer 13 of the lid assembly 9 comprises a base 53, a mounting flange 55 and an annular neck 57 projecting upward from the base and flange that is received inside the central aperture 41 of the cover 11. The base 53 has an air hole 59 through it for permitting air to pass from a location exterior of the container 3 into the interior of the container. As may be seen in FIG. 6, the air hole 59 is offset to one side of a center of the base 53. An annular seat 61 is formed around the center of the base 53 for use in sealing off the air hole 59 from the interior of the container 3, as will be described more fully hereinafter. The neck 57 is fixedly attached to the cover 11 in the central aperture 41 such as by welding or gluing. It will be appreciated that the retainer 13 may be releasably attached to the cover 11 without departing from the scope of the present invention. The cover 11 and retainer 13 of the lid assembly 9 are formed separately in the illustrated embodiments for convenience in manufacturing, but the two may be formed as a single piece. Thus, the lid assembly 9 can include only one component part in the present invention. It is desirable that the cover 11 and retainer 13 be formed as a unit in the finished drinking cup 1 to reduce the number of component parts of the drinking cup to be handled by the care givers of the child using the cup. The mounting flange 55 projects radially outwardly from the lower end of the central aperture 41 of the cover 11 and is used to mount the diaphragm seal 15 on the lid assembly 9.

Figure 5:
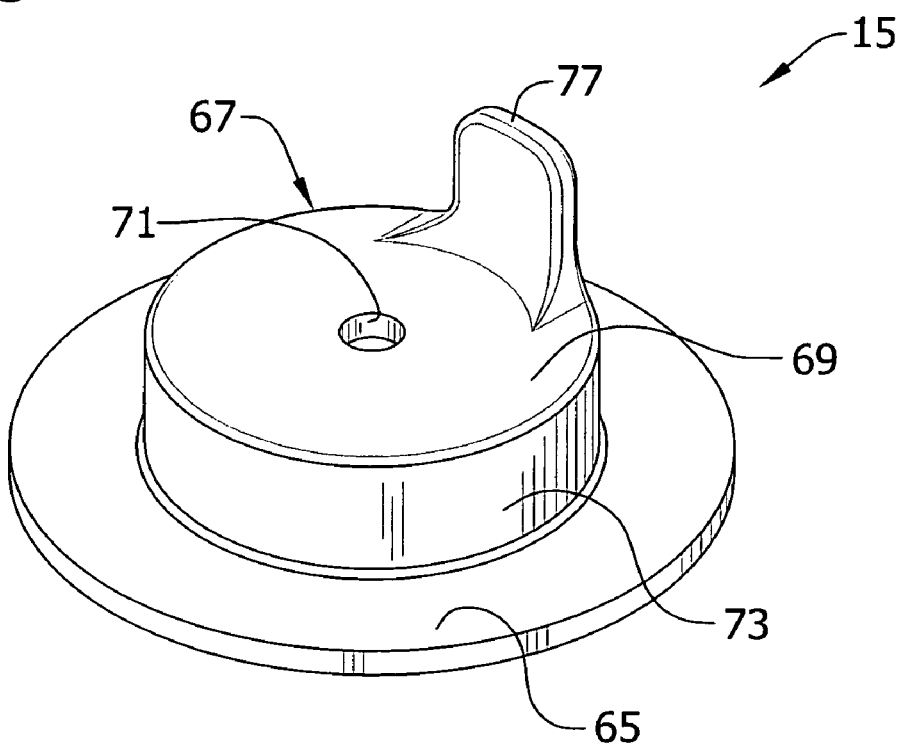
FIG. 5 is a bottom perspective of the diaphragm seal.

The diaphragm seal 15 has a roughly saucer shape including an annular flange having a generally flat peripheral edge margin 65 and a shallow cylindrical central portion (indicated generally at 67). The central portion includes a circular bottom wall 69 (broadly, "a sealing section") having a central air hole 71. A side wall 73 of the central portion 67 is shaped to define an annular mounting recess 75 immediately adjacent to the bottom wall 69. The diaphragm seal 15 can be snapped onto and off of the retainer 13 so that the mounting flange 55 of the retainer is received in the mounting recess 75 of the diaphragm seal. A tab 77 (FIGS. 4 and 5) is formed on the bottom wall 69 of the diaphragm seal 15 to facilitate gripping for pulling the diaphragm seal off of the retainer 13. The tab 77 may be omitted without departing from the scope of the present invention. The resiliency of the diaphragm seal material holds the seal 15 on the mounting flange 55. It is easy to attach the diaphragm seal 15 to the retainer 13, and to remove it again. Thus, the construction permits the separable components of the drinking cup 1 (i.e., the container 3, the cover 11 and the diaphragm seal 15) to be taken apart for thorough cleaning and to be readily reassembled for the next use. The separable components are all relatively large so that they are easy to handle and are not easily lost. The bottom wall 69 of the diaphragm seal 15 bears against the annular seat 61 formed on the underside of the retainer 13 and seals against the seat. Thus, the air hole 59 in the retainer 13 is blocked from fluid communication with the air hole 71 in the bottom wall 69 of the diaphragm seal 15.

When the lid assembly 9 carrying the diaphragm seal 15 is screwed onto the container 3 as shown in FIG. 2, the underside of the peripheral edge margin 65 of the diaphragm seal flange engages the top edge 31 of the inner rim 21 of the container and seals with the inner rim. The peripheral edge margin 65 is driven down far enough by the cover 11 so that the inner rim 21 deflects the peripheral edge margin upward very slightly, causing the peripheral edge margin to bear against the inner rim and seal with the inner rim. The bottom wall 69 seals with the seat 61 to block the interior of the container 3 from the air hole 59. It will be appreciated that the diaphragm seal 15 seals the open top 7 of the container 3 so that liquid in the container cannot flow past the diaphragm seal and out of the drinking cup 1. Thus, if the drinking cup is upset or turned upside down, liquid in the container 3 will not spill out of the spout 43 or air hole 59.

Figure 3:
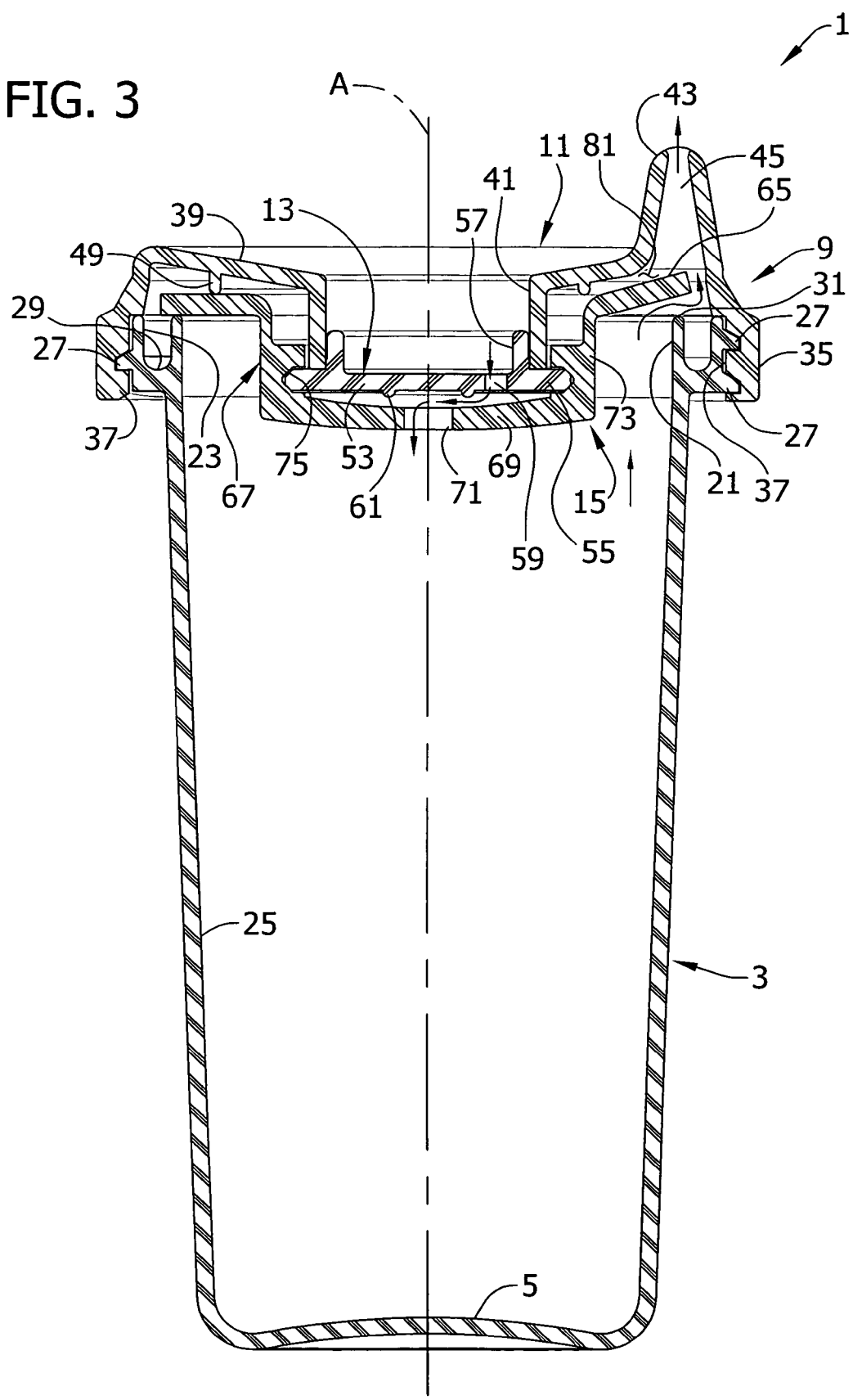
FIG. 3 is the vertical section of FIG. 2, but illustrates the configuration of a diaphragm seal of the cup when a vacuum is applied for drawing liquid out of the cup.

Referring now also to FIG. 3, it is easy for a small child to get a drink out of the drinking cup 1 by placing her lips on the spout 43 so as to form a seal with the spout, and sucking. Sucking air from a space 81 (or "vacuum chamber") between the cover 11 and the diaphragm seal 15 creates a vacuum in the space. Because of the shape of the cover 11, the space 81 is located directly over the peripheral edge margin 65 of the diaphragm seal flange. The space 81 is generally annular and extends between an interior wall of the central aperture 41 and the skirt 35 of the cover 11. The air pressure within the container 3 pushes on the underside of the peripheral edge margin 65 which deflects upward from the sealed position shown in FIG. 2, to an unsealed position shown in FIG. 3. Liquid is now permitted to flow past the diaphragm seal 15 at the inner rim 21 of the container 3 to the spout 43 for drinking as indicated by the arrows in FIG. 3. The liquid is able to flow directly along the inner surface 25 of the container 3 because the diaphragm seal 15 engages the upper edge 31 of the inner rim 23 that is a smooth continuation of the inner surface. This makes it easier to empty the entire liquid content of the container 3 without changing the angle at which the cup 1 is held.

The peripheral edge margin 65 is not allowed to open everywhere, and particularly not in regions which are radially opposite from the spout 43. This prevents the child from sucking in air from the container 3, which is particularly a problem as the container is increasingly emptied of liquid. Keeping the peripheral edge margin 65 sealed with the inner rim 21 in locations away from the spout 43 is accomplished by the hold down rib 49 that depends from the bottom of the cover 11. The rib 49 engages the top surface of the peripheral edge margin 65 in certain places to hold it down against the inner rim 21 of the container 3 even when vacuum pressure is present in the space above the peripheral edge margin. As previously described, and shown in FIG. 7A, the rib 49 is eccentric of the center of the cover 11, and thereby offset away from the spout 43. It will be understood that a rib of the present invention may have a geometry that does not have a center. In that event, "eccentric" simply means that the rib is not located symmetrically about the center of the cover.

As a result of its positioning, the rib 49 engages the portion of the peripheral edge margin 65 which is located radially opposite from the spout 43 very near the peripheral edge of the diaphragm seal 15, and so holds the peripheral edge margin tightly closed in these locations. Moving around the peripheral edge margin 65 in either direction from a radially opposite location from the spout 43, the rib 49 engages the peripheral edge margin progressively farther from the peripheral edge. Near the spout 43, the rib 49 does not engage the peripheral edge margin 65 at all. Thus, the peripheral edge margin is completely free to flex upwardly near the spout 43 and entirely prevented from flexing radially opposite to the spout. In between, the peripheral edge margin 65 is held with changing amounts of leverage by the rib 49. The peripheral edge margin 65 may open in locations where the engagement of the rib 49 with the peripheral edge margin occurs at a distance spaced inwardly sufficiently from the edge. By associating the hold down rib 49 with the cover 11, the diaphragm seal 15 and container 3 can have a completely symmetrical construction. No matter where the spout 43 is angularly located with respect to the central axis A of the container 3, the diaphragm seal 15 will always be able to open most easily immediately under the spout, and be held from opening at locations radially opposite the spout.

As liquid is drawn out of the container 3 by the child, the air pressure in the container is gradually reduced. Drawing a vacuum in the container 3 makes it increasingly difficult to keep the diaphragm seal 15 open. To break the vacuum, the bottom wall 69 of the diaphragm seal 15 deflects down as vacuum is detected in the container 3. More specifically, air pressure acting through the air hole 59 in the retainer 13 pushes the bottom wall 69 of the diaphragm seal 15 down so that the seal with the annular seat 61 on the underside of the retainer is eventually broken. Air can then pass from the air hole 59 in the retainer 13 to the air hole 71 in the center of the bottom wall 69 of the diaphragm seal 15 and thence to the interior of the container 3. This configuration is illustrated in FIG. 3. The air holes 59, 71, retainer base 53 and bottom wall 69 of the diaphragm seal 15 define an air passage for delivering air from outside the container 3 to the interior of the container.

The operation of the bottom wall 69 of the diaphragm seal 15 to release its seal with the annular seat 61 is entirely independent of the movement of the peripheral edge margin 65 of the diaphragm seal, and can occur periodically when needed to restore a substantially ambient air pressure within the container 3 so that it does not become progressively harder to drawn liquid out of the container. The vertically offset location of the peripheral edge margin 65 from the bottom wall 69 of the diaphragm seal 15 mechanically isolates the two portions so that they can operate as independent valves, and so that movement of either of the peripheral edge margin and the bottom wall does not affect the sealing attachment of the diaphragm seal with the retainer 13. The offset is provided by the side wall 73 (broadly, "an isolation section") of the central portion 67 of the diaphragm seal 15. Similarly, the sealed connection of the retainer mounting flange 55 in the mounting recess 75 of the diaphragm seal 15 does not interfere with movement of peripheral edge margin 65 or movement of the bottom wall 69 around the air hole 71. It is to be understood that other ways of isolating the peripheral edge margin 65 from the bottom wall 69, and of isolating these moving parts from the location of connection of the diaphragm seal 15 to the retainer 13 may be used within the scope of the present invention. The location of the flange including the peripheral edge margin 65 at the top of the side wall 73 of the central portion 67 prevents or isolates the peripheral edge margin from significantly reshaping the entire diaphragm seal 15 when flexed so that a good and consistent fit and relative relationship between the diaphragm seal and other parts of the drinking cup 1 (particularly the retainer 13) can be maintained.

Figure 8:
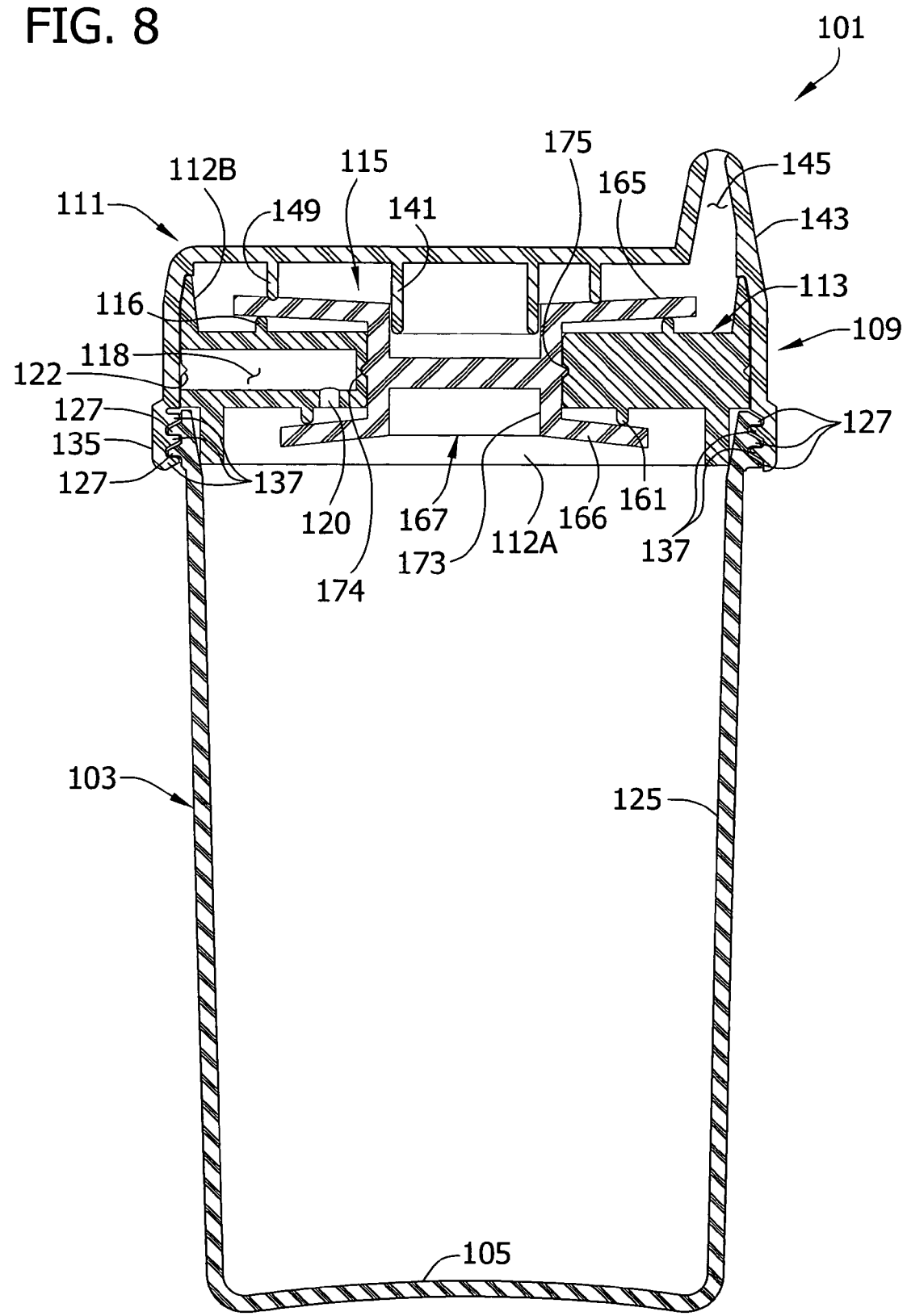
FIG. 8 is a vertical section of a drinking cup of a second embodiment.

Referring now to FIG. 8, a second embodiment of the drinking cup 101 comprises a container 103, a lid assembly 109 including a cover 111 and a retainer 113, and a diaphragm seal 115. Parts of the drinking cup 101 of the second embodiment corresponding to those of the drinking cup 1 of the first embodiment will be given the same reference numeral, plus "100". The cover 111 has a spout 143 defining an opening 145 for liquid to pass through the cover. The cover 111 has a skirt 135 with internal threads 137 capable of mating with external threads 127 located at the upper end of the container 103. A hold down rib 149 depends from the bottom surface of the cover 111. As before, the hold down rib 149 extends along a closed curve having a center which is eccentric to the center of the cover 111.

Figure 9:
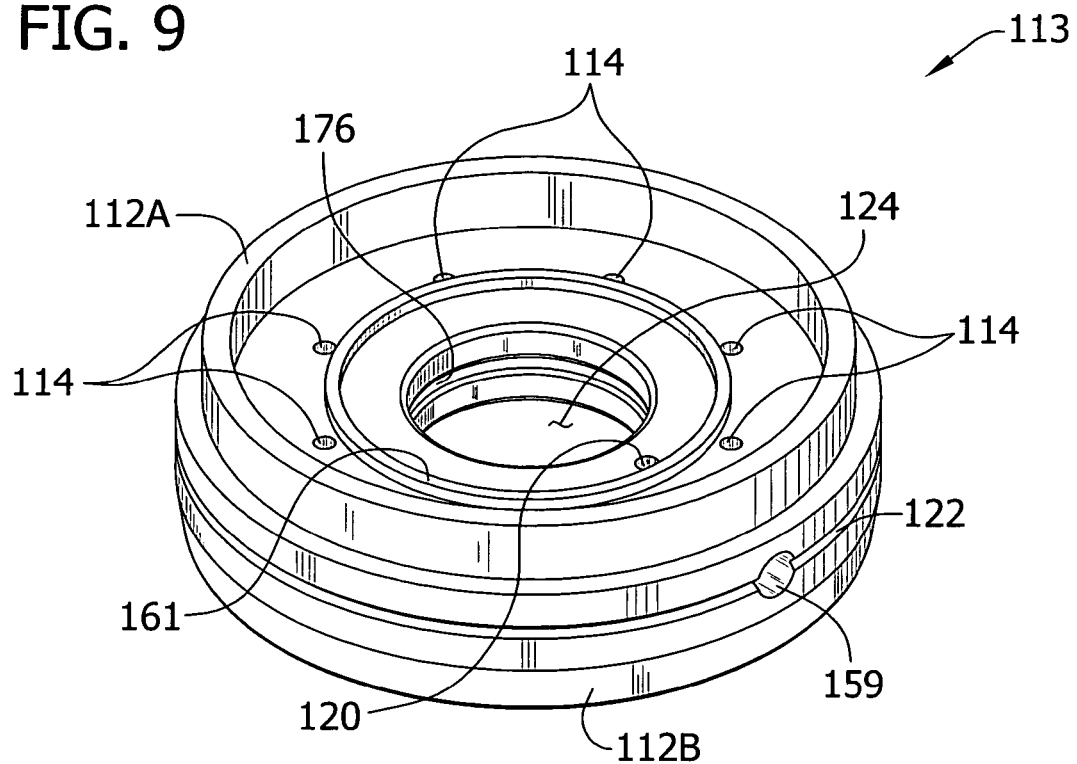
FIG. 9 is a bottom perspective of a retainer of the cup of FIG. 8.
Figure 9A:
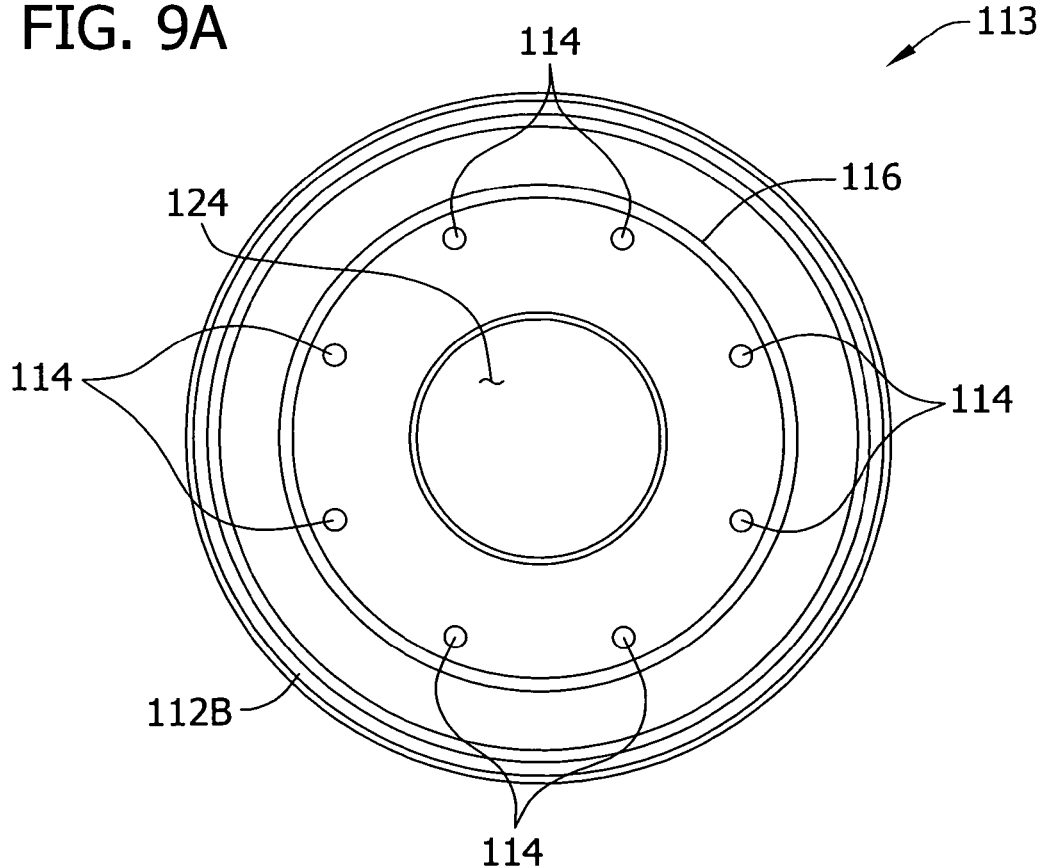
FIG. 9A is a top plan of the retainer of FIG. 9.

In the second embodiment, the retainer 113 is separate from the cover 111 in the final form of the drinking cup 101 purchased by the end user. The retainer 113 is annular in shape and has a lower collar 112A sealingly received against the inner surface 125 of the container 103 for sealing with the container. An upper collar 112B of the retainer engages and seals with the cover 111. The retainer 113 has no fixed connection to the container 103, and can be removed when the cover 111 is removed. The retainer 113 has a plurality of holes 114 spaced around its circumference (FIGS. 9 and 9A) that permit liquid to pass through the retainer. On an upper surface of the retainer 113, a first annular seat 116 is formed. The circumferentially spaced holes 114 are located radially inwardly of the first annular seat 116. A second annular seat 161 is formed on the lower surface of the retainer 113. The retainer has a radially extending air passage 118 that extends between an air hole 159 in the side of the retainer and an air hole 120 in the lower surface of the retainer 113. The side of the retainer 113 has a circumferential notch 122 so that the air hole 159 on the side of the retainer is not sealed by engagement with the cover 111. The threaded attachment of the cover 111 to the container 103 is configured in a known way so that air can pass along the threads 137, 127 from the exterior of the drinking cup 101 to the air hole 159 in the side of the retainer 113.

The diaphragm seal 115 has the shape of a spool in the second embodiment. The diaphragm seal 115 has a central portion (generally indicated at 167), an upper flange defining a peripheral edge margin 165, and a lower flange 166. The diaphragm seal 115 is received through a center opening 124 of the annular retainer 113 so that the peripheral edge margin 165 of the upper flange overlies the upper surface of the retainer and the lower flange 166 underlies the lower surface of the retainer. The peripheral edge margin 165 of the upper flange makes sealing contact with the first annular seat 116 and the lower flange 166 makes sealing contact with the second annular seat 161. A side wall 173 of the central portion 167 isolates movement of the peripheral margin 165 of the upper flange from movement of the lower flange 166. More importantly, the sealed connection of the diaphragm seal 115 with the retainer 113 is isolated from effects of the movements of the peripheral edge margin 165 and lower flange 166. In addition, the sealed connection of the diaphragm seal 115 with the retainer 113 does not impede movement of peripheral edge margin 165 or lower flange 166. The diaphragm seal 115 is sealingly connected to the retainer 113 by a circumferential ridge 174 on the side wall 173 that is received in a locking channel 175 in the center aperture 124.

The hold down rib 149 engages a top surface of the upper flange 165. The portions of the upper flange that are radially opposite the spout 143 are engaged nearer to their peripheral edges so that they are firmly held in sealing engagement with the first annular seat 116. Moving from a radially opposite location to a location directly under the spout 143, the position of engagement on the upper flange 165 moves gradually radially inward so that a lesser holding force is applied by the rib 149. When a child sucks on the spout 143, the vacuum pressure above the peripheral edge margin 165 of the upper flange causes the peripheral edge margin to flex upward. Liquid can now move past the retainer 113 through the holes 114 and to the spout 143 for drinking. As liquid is removed and vacuum pressure increases in the container 103, the lower flange 166 is deflected off of the second annular seat 161 so that air can pass from the air hole 159, through the passage 118 and into the container 103 through air hole 120. The movement of the lower flange 166 is independent of the movement of the upper flange 165.

Figure 11:
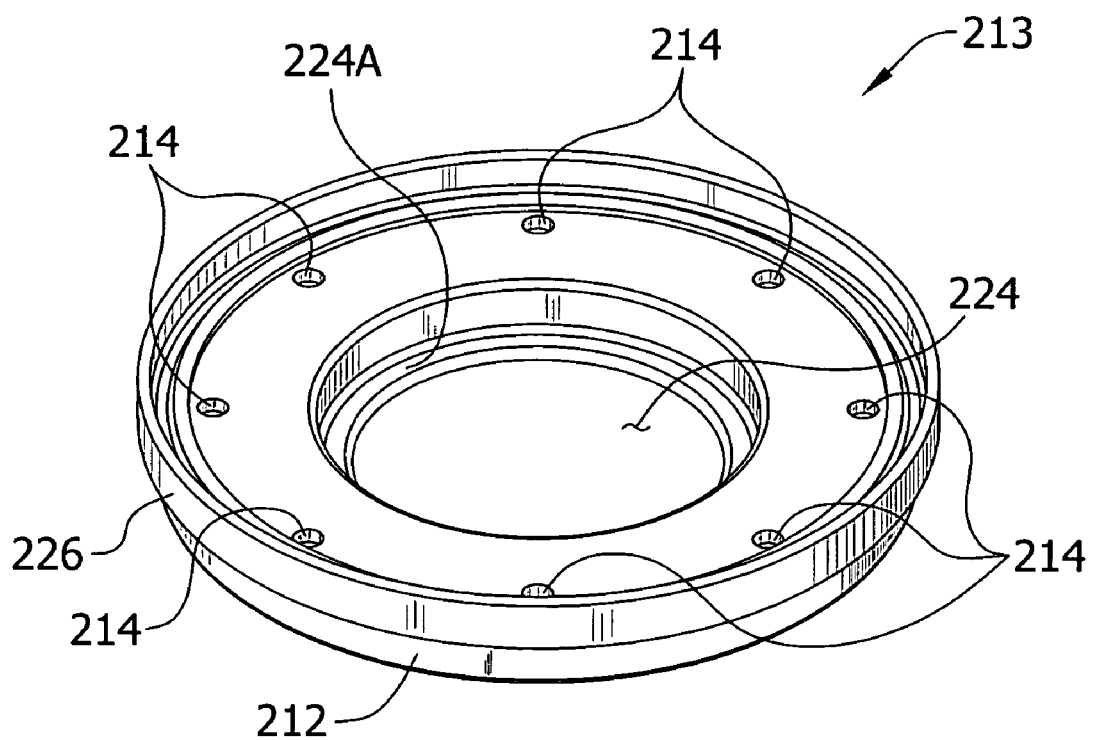
FIG. 11 is a top perspective of a retainer of the cup of FIG. 10.

Referring now to FIGS. 10 and 11, a third embodiment of a drinking cup 201 constructed according to the principles of the present invention is shown to comprise a container 203, a lid assembly 209 including a cover 211 and a retainer 213, and a diaphragm seal 215. Parts of the drinking cup 201 of the third embodiment corresponding to those of the drinking cup 1 of the first embodiment will be given the same reference numeral, plus "200". Parts of the drinking cup 203 corresponding to those of the drinking cup 103 of the second embodiment will be given the same reference numeral, plus "100". The cover 211 has a spout 243 defining an opening 245 for liquid to pass through the cover. The cover 211 has a skirt 235 with internal threads 237 capable of mating with external threads 227 located at the upper end of the container 203. A hold down rib 249 depends from the bottom surface of the cover 211. As before, the hold down rib 249 extends along a closed curve having a center which is eccentric to the center of the cover 211. Air holes 259 located on the cover 211 around a center portion permit air to pass through the cover. An annular seat 261 depends from the underside of the cover 211 radially inward of the air holes 259. An annular sealing ridge 262 located radially outwardly from the seat 261 seals with the diaphragm seal 215 to block fluid communication of a space radially inward of the ridge from the space between the cover and diaphragm seal located radially outwardly of the ridge. Thus, any liquid from the container 203 located between the bottom of the cover 211 and the diaphragm seal 215 cannot access the air holes 259.

In the third embodiment (like the second), the retainer 213 is separate from the cover 211 in the final form of the drinking cup 203 purchased by the end user. The retainer 213 is annular in shape and has a collar 212 sealingly received against the inner surface 225 of the container 203 for sealing with the container. The retainer 213 has no fixed connection to the container 203, and can be removed when the cover 211 is removed. The retainer 213 has a plurality of holes 214 spaced around its circumference that permit liquid to pass through the retainer (FIG. 11). An annular seat 216 is formed on an upper surface of the retainer 213. The spaced holes 214 are located radially inwardly of the annular seat 216. A cover sealing wall 226 projecting from an upper surface of the retainer 213 extends around the perimeter of the retainer and is used to seal the retainer with the cover 211.

The diaphragm seal 215 is circular and substantially flat, but has a mounting lip 228 depending from the lower surface of the diaphragm seal received in a center opening 224 of the retainer 213. The lower end of the mounting lip 228 engages a ledge 224A of the center opening 224 and provides a reaction surface to the compression applied by the cover 211. The mounting lip 228 grips the retainer 213 for use in holding the diaphragm seal 215 in position on the retainer. An air hole 271 located in the center of the diaphragm seal 215 is positioned in the middle of the annular seat 261 on the cover 211 so that the diaphragm seal normally seals with the seat and blocks the path between the air holes 259 (only two are shown) in the cover and the center air hole 271 of the diaphragm seal to prevent leakage of liquid out of the drinking cup 201. The number of air holes 259 may be fewer or greater than two within the scope of the present invention.

A peripheral edge margin 265 of a flange of the diaphragm seal 215 overlies and sealingly engages the annular seat 216 on the top side of the retainer 213. Thus, the holes 214 in the retainer 213 are normally blocked by the diaphragm seal 215. When a child applies a vacuum through the spout 243, the peripheral edge margin 265 deflects up (except where held down by the hold down rib 249 on the cover 211) to uncover the holes 214 in the retainer 213 for permitting liquid in the container 203 to pass through the retainer, past the diaphragm seal 215 and out of the drinking cup 201 through the spout. When the air pressure in the container 203 gets sufficiently low, the central portion 267 of the diaphragm seal 215 (in this embodiment, the portion of the diaphragm seal radially inward of the mounting lip 228) is deflected downward around the center air hole 271 so that the diaphragm seal moves off of the annular seat 261 on the bottom of the cover 211. This allows air to pass from the air holes 259 in the cover 211 to the center air hole 271 in the diaphragm seal and into the container 203 for generally equalizing the pressure in the container with ambient. The diaphragm seal 215, cover 211, retainer 213 and container 203 can all be separated from one another for cleaning.

Figure 12:
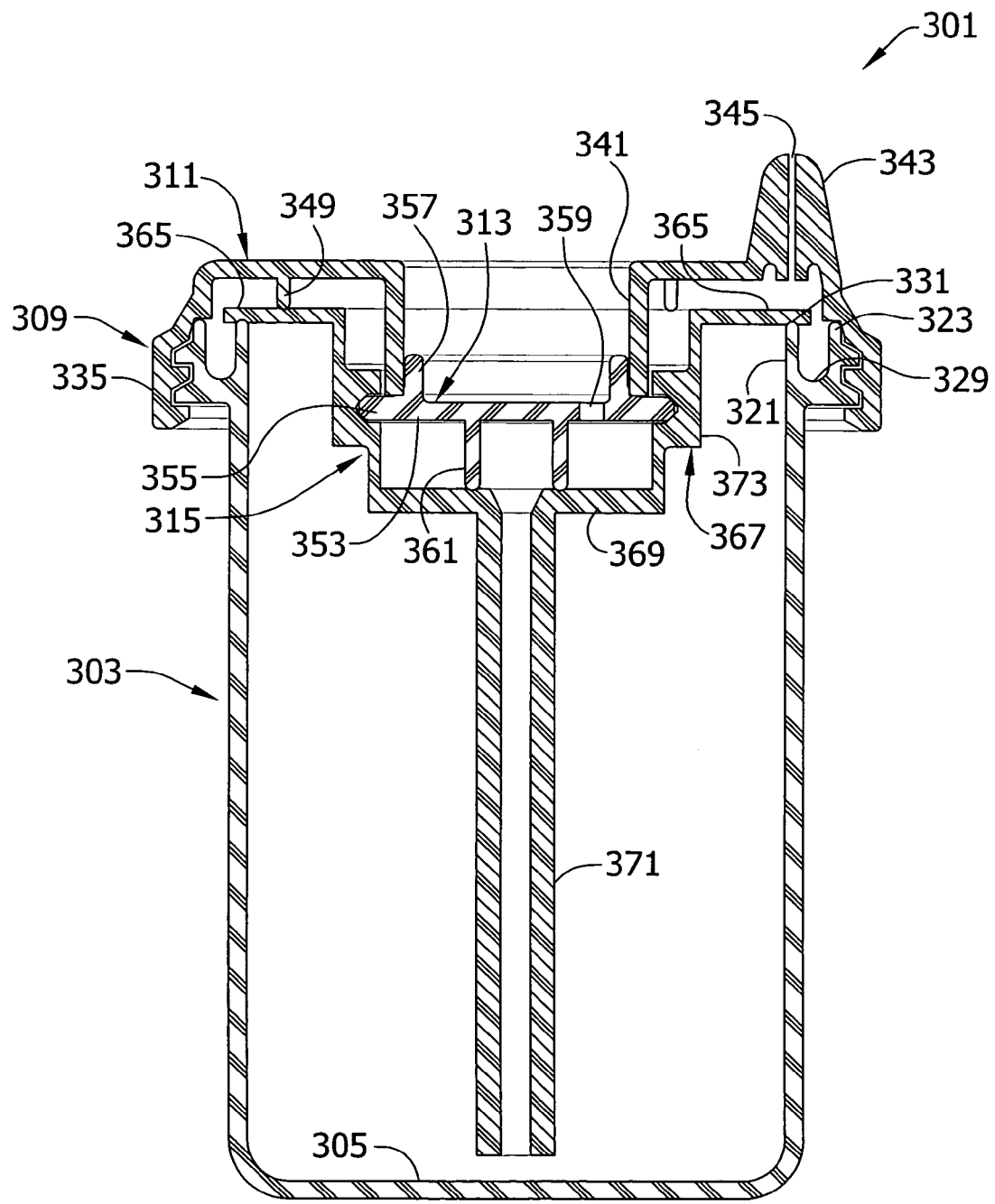
FIG. 12 is a vertical section of a drinking cup of a fourth embodiment.
Figure 13:
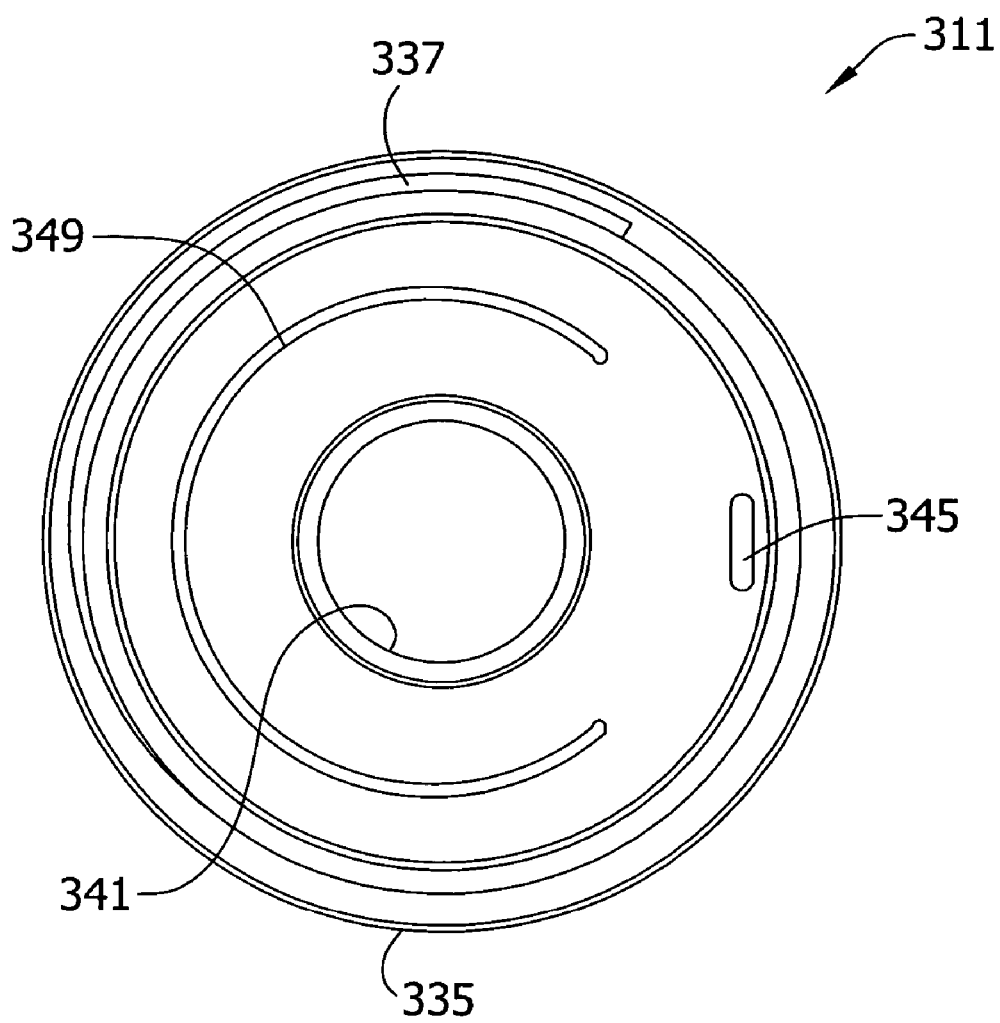
FIG. 13 is a bottom plan of a cover of the drinking cup of FIG. 12.

A fourth embodiment of the drinking cup 301 shown in FIGS. 12 and 13 is very similar in construction to the drinking cup 1 of the first embodiment. A retainer 313 is fixed to a cover 311 in a center aperture 341, and may be formed as one piece with the cover. Parts of the drinking cup 301 of the fourth embodiment corresponding to those of the drinking cup 1 of the first embodiment will be given the same reference numeral, plus "300". A container 303 is substantially identical to the container 3 of the first embodiment. The cover 311 is similar to the cover 11, but has a hold down rib 349 that is C-shaped rather than annular (see FIG. 13). In regions nearest to a spout 343 of the cover 311, the rib 349 is completely absent and so can have no effect on the movement of a peripheral edge margin 365 of a diaphragm seal 315. An annular seat 361 on the underside of the retainer 313 is positioned in the same place as the seat 61 of the first embodiment, but is much taller. The height of the annular seat 361 is necessary because of the somewhat more vertically elongated configuration of a central portion 367 of the diaphragm seal 315 as compared with its counterpart 67 of the first embodiment.

The vertical elongation of side wall 373 of the central portion 367 of the diaphragm seal 315 further separates a bottom wall 369 of the diaphragm seal from the peripheral edge margin 365. In this way, the movements of the peripheral edge margin 365 and the bottom wall 369 are even more isolated from one another and from the sealed connection of the diaphragm seal 315 with the retainer 313. Movement of the peripheral edge margin 365 to open the path from the container 303 to the spout 343 has no effect on the seal of the bottom wall 369 with the annular seat 361 and movement of the bottom wall relative to the seat has no effect on the seal of the peripheral edge margin with the upper edge 331 of the inner rim 321. Moreover, the diaphragm seal 315 has substantial dimensional stability during the movement of the peripheral edge margin 365 and the bottom wall 369.

Another distinction of the diaphragm seal 315 of the fourth embodiment from the diaphragm seal 15 of the first embodiment is that instead of a simple air hole 71 in the center of the diaphragm seal, there is a long air tube 371 extending from the bottom wall 369 of the central portion 367 nearly to the bottom 305 of the container 303. The tube 371 is formed as one piece with the diaphragm seal 315, but could be formed as a separate piece. The tube 371 is positioned so that its open bottom end will be clear of liquid in the container 303 so that air passing into the container through the air tube for equalizing pressure with the ambient pressure does not pass through the liquid in the container. In other respects, the drinking cup 303 of the fourth embodiment operates in the same way as the drinking cup 1 of the first embodiment, and will not be further described.

Figure 14:
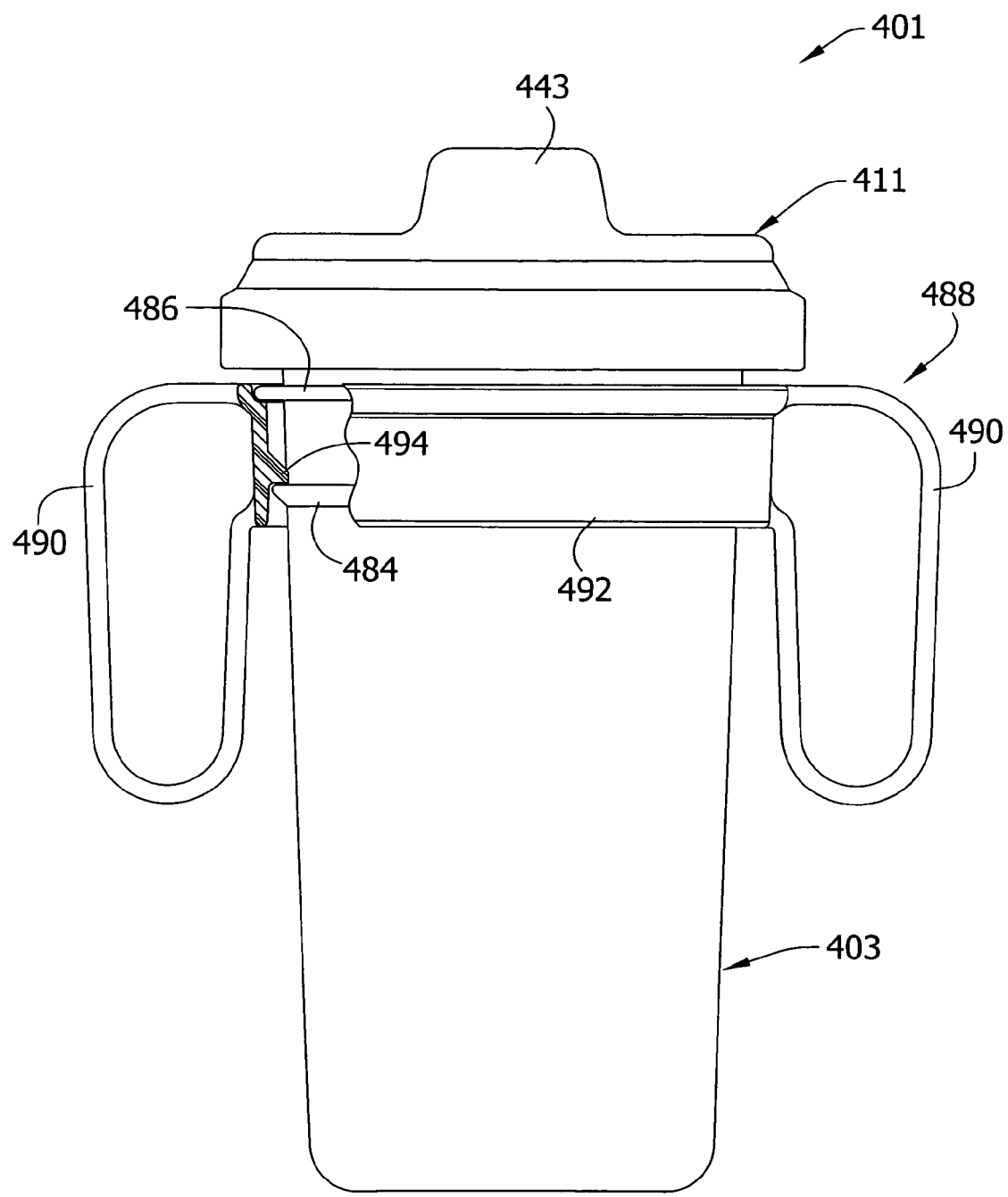
FIG. 14 is an elevation of a drinking cup of a fifth embodiment including a handle unit that has been partially broken away.
Figure 15:
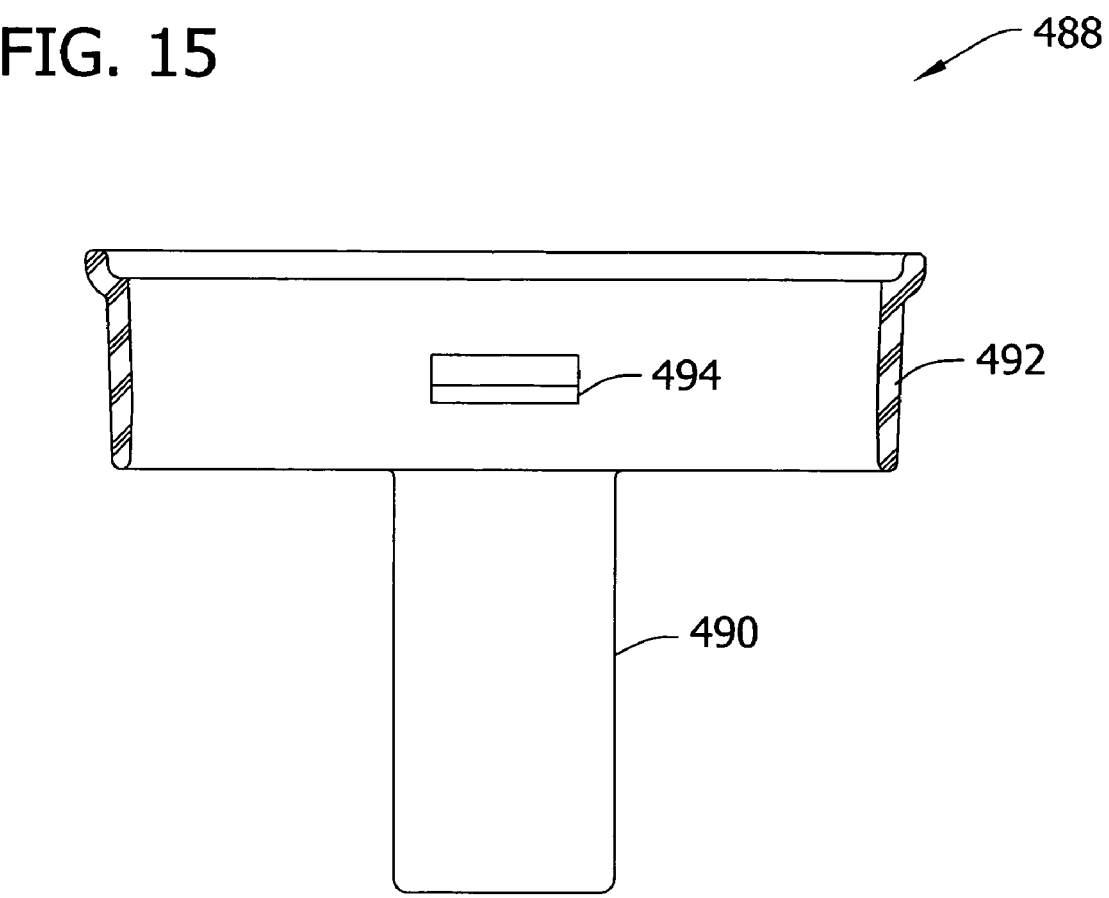
FIG. 15 is a cross section of the handle unit.

A drinking cup 401 of the fifth embodiment shown in FIG. 14 may have the same internal construction as any one of the preceding drinking cups 1, 101, 201, 301, or a different construction. Parts of the drinking cup 401 of the fifth embodiment corresponding to those of the drinking cup 1 of the first embodiment will be given the same reference numeral, plus "400". However, the drinking cup 401 of the fifth embodiment has a container 403 that is formed with a locking flange 484 and a stop ring 486 on its outer surface for releasably connecting a handle unit (generally indicated at 488) to the drinking cup. The locking flange 484 and stop ring 486 extend continuously around the circumference of the container 403, but could extend only part way around and/or be formed of multiple spaced apart pieces within the scope of the present invention. The locking flange 484 has a wedge shaped lower surface. The handle unit 488 includes two handles 490 that make the cup easier to hold and move for very small toddlers. It is to be understood that a handle unit (not shown) could include one handle or more than two handles within the scope of the present invention. The handles 490 are connected together by a connecting ring 492 that can be slid over the container 401 from the bottom thereof. A portion of the connecting ring 492 is broken away in FIG. 14 to show the locking flange 484 and stop ring 486 on the container 403.

The connecting ring 492 is formed with a nub 494 at each handle 490 having a wedge-shaped upper surface so that when the nub reaches the wedge shaped lower surface of the locking flange 484, the connecting ring and handles are forced outwardly so that the nub can pass the locking flange. Upon clearing the flange 484, the natural resiliency of the handle unit 488 causes the handles 490 to snap back toward each other so that the nubs 494 are located against a flat upper surface of the locking flange. The stop ring 486 engages the connecting ring 492 at an upper edge to prevent further upward movement of the handle unit 488 on the container 403. The handle unit 488 is held on the container 403 between the locking flange 484 and stop ring 486. Removing the handle unit 488 when not needed can be accomplished by manually deflecting the lower portions of the handles 490 away from each other so that the nubs 494 clear the locking flange 484 and the handle unit can be slid down off of the container 403.

When introducing elements of the present invention or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the invention, it is intended that all matter contained in the above description and shown in the accompanying drawings shall be interpreted as illustrative and not in a limiting sense.

What is claimed is:

1. A leak resistant drinking cup comprising a container having an interior space sized and shaped for receiving and holding a quantity of liquid for drinking, said container having an open top, a lid assembly adapted for removable attachment to the container for closing the open top, said lid assembly having a rigid spout for drinking liquid from said cup, a flexible diaphragm seal adapted to be disposed between the lid assembly and at least a portion of the interior space the container for selectively blocking the flow of liquid from the interior space of the container to the spout, and a retainer adapted for use in mounting the diaphragm seal on the container, the diaphragm seal having a circumference and a peripheral edge margin extending about the circumference of the seal, the lid assembly and the seal being configured such that upon assembly of the lid assembly, the seal and the container, a circumferential portion of the peripheral edge margin of the seal is flexible between a closed position in which said circumferential portion of the peripheral edge margin blocks the flow of liquid from the interior space of the container to the spout, and an open position in which liquid is permitted to flow over said circumferential portion of the peripheral edge margin for subsequent flow to the spout, another circumferential portion of the peripheral edge margin of the seal being retained against movement to said open position, the leak resistant drinking cup further comprising an air passage adapted to extend from the interior space of the container to a location exterior of the container for permitting air flow into the container to relieve vacuum pressure in the container, the diaphragm seal being arranged to block communication of the air passage with the interior of the container, but being flexible to unblock the passage upon detection of vacuum pressure in the container, the retainer having an air passage defined therein for communication of air from the exterior to the interior of the container, the diaphragm seal being adapted to releasably seal with the retainer to block communication of the air passage with the interior of the container, the diaphragm seal being adapted to resiliently flex upon detection of vacuum pressure in the container to unblock the air passage and permit air to flow through the air passage to the interior of the container.

2. A leak resistant drinking cup as set forth in claim 1 wherein the diaphragm seal is adapted to be releasably supported by the lid assembly.

3. A leak resistant drinking cup as set forth in claim 2 wherein a central portion of the diaphragm seal is adapted for snap-on engagement with the lid assembly.

4. A leak resistant drinking cup as set forth in claim 2 wherein the diaphragm seal further comprises a tab projecting outwardly from the seal for grasping to separate the seal from the lid assembly.

5. A leak resistant drinking cup as set forth in claim 1 wherein the lid assembly comprises a cover and the retainer is adapted to be supported in a fixed position with respect to the container.

6. A leak resistant drinking cup as set forth in claim 5 wherein the diaphragm seal is adapted for snap-on engagement with the retainer.

7. A leak resistant drinking cup as set forth in claim 1 wherein the lid assembly includes a hold down rib integrally molded in one piece with a cover of the lid assembly and engageable with said another circumferential portion of the peripheral edge margin of the diaphragm seal upon assembly for holding down said another circumferential portion of the peripheral edge margin.

8. A leak resistant drinking cup as set forth in claim 1 wherein the diaphragm seal includes a central portion located radially inward of the peripheral edge margin, the central portion of the diaphragm seal and the lid assembly each having an air hole therein defining opposite ends of the air passage, the central portion of the diaphragm seal having a sealing section adapted to releasably seal with the lid assembly to block the air passage between the air holes, the sealing section of the central portion being adapted to resiliently flex upon detection of vacuum pressure in the container to unblock the air passage and permit air to flow through the air holes in the lid assembly and the diaphragm seal to the interior space of the container.

9. A leak resistant drinking cup as set forth in claim 8 wherein the diaphragm seal further comprises an isolation section adapted to mechanically isolate the movement of the circumferential portion of the peripheral edge margin and the movement of the sealing section from other parts of the diaphragm seal.

10. A leak resistant drinking cup as set forth in claim 9 wherein the isolation section comprises a wall connecting the diaphragm seal flange to the sealing section, the wall being oriented at an angle to both the flange and the sealing section.

11. A leak resistant drinking cup as set forth in claim 1 wherein the diaphragm seal comprises an air tube projecting from the central portion thereof, the air tube defining the diaphragm seal air hole and being arranged to extend toward a bottom of the container when the diaphragm seal is assembled with the container.

12. A leak resistant drinking cup as set forth in claim 1 further comprising a handle unit adapted to be releasably connected to the container.

13. A leak resistant vessel as set forth in claim 1 wherein a central portion of the diaphragm seal is adapted for snap-on engagement with the lid assembly.

14. A leak resistant vessel comprising a container having an interior space sized and shaped for receiving and holding a quantity of liquid, the container having an open top and a central axis, a lid assembly adapted for removable attachment to the container to close the open top of the container, the lid assembly having an opening therein through which liquid can exit the vessel, a flexible diaphragm seal adapted to be at least partially disposed between the lid assembly and the interior space of the container for selectively blocking the flow of liquid from the container to the opening in the lid assembly, the diaphragm seal extending circumferentially about the central axis of the container and having a peripheral edge margin adapted to, as installed between the lid assembly and the container, flex between a closed position in which the peripheral edge margin of the diaphragm blocks the flow of liquid from the container to the opening of the lid assembly, and an open position in which liquid is permitted to flow from the interior space of the container over a portion of the peripheral edge margin for subsequent flow to the lid assembly opening, and a hold down connected to the lid assembly and sized and shaped for holding down a portion of the peripheral edge margin of the diaphragm seal when assembled on the container to hold the diaphragm seal portion against flexing from the closed position to the open position while permitting another portion of the peripheral edge margin of the diaphragm seal to flex from the closed position to the open position upon application of a vacuum pressure between the lid assembly and the diaphragm seal, wherein the lid assembly comprises a spout defining the opening therein, the hold down being adapted for holding down a portion of the diaphragm seal that is disposed generally at one side of the central axis of the container that is radially opposite a side of the central axis at which the spout is disposed when the lid assembly, hold down and diaphragm seal are assembled on the container.

15. A leak resistant vessel as set forth in claim 14 wherein the hold down is integrally molded in one piece with the lid assembly.

16. A leak resistant vessel as set forth in claim 14 wherein the hold down is a continuous piece.

17. A leak resistant vessel as set forth in claim 16 wherein the hold down comprises a rib depending from a bottom surface of the lid assembly, the rib extending around a center of the lid assembly in a ring that is arranged eccentrically with respect to the center of the lid assembly.

18. A leak resistant vessel as set forth in claim 17 wherein the spout and center of the rib ring are located on radially opposite sides of the center axis of the container.

19. A leak resistant vessel as set forth in claim 17 wherein the rib is generally C-shaped.

20. A leak resistant vessel as set forth in claim 14 wherein the lid assembly comprises a cover and a retainer adapted to be supported in a fixed position with respect to the container.

21. A leak resistant vessel as set forth in claim 20 wherein the diaphragm seal is adapted for snap-on engagement with the retainer.

22. A leak resistant vessel comprising a container having an interior space sized and shaped for receiving and holding a quantity of liquid, the container having an open top and a central axis, a lid assembly adapted for removable attachment to the container to close the open top of the container, the lid assembly having an opening therein through which liquid can exit the vessel, a flexible diaphragm seal adapted to be at least partially disposed between the lid assembly and the interior space of the container for selectively blocking the flow of liquid from the container to the opening in the lid assembly, the diaphragm seal extending circumferentially about the central axis of the container and having a peripheral edge margin adapted to, as installed between the lid assembly and the container, flex between a closed position in which the peripheral edge margin of the diaphragm blocks the flow of liquid from the container to the opening of the lid assembly, and an open position in which liquid is permitted to flow from the interior space of the container over a portion of the peripheral edge margin for subsequent flow to the lid assembly opening, and a hold down sized and shaped for holding down a portion of the peripheral edge margin of the diaphragm seal when assembled on the container to hold the diaphragm seal portion against flexing from the closed position to the open position while permitting another portion of the peripheral edge margin of the diaphragm seal to flex from the closed position to the open position upon application of a vacuum pressure between the lid assembly and the diaphragm seal, wherein the lid assembly and diaphragm seal as installed on the container are adapted to define a vacuum chamber therebetween in communication with the peripheral edge margin of the seal about substantially an entire circumference of the seal, and wherein the peripheral edge margin of the diaphragm seal engages an edge of the container defining the open top of the container.

23. A leak resistant drinking cup comprising a container having an interior space sized and shaped for receiving and holding a quantity of liquid for drinking, said container having an open top, a lid assembly adapted for removable attachment to the container for closing the open top, said lid assembly having a rigid spout for drinking liquid from said cup, a flexible diaphragm seal adapted to be disposed between the lid assembly and at least a portion of the interior space the container for selectively blocking the flow of liquid from the interior space of the container to the spout, and a retainer adapted for use in mounting the diaphragm seal on the container, the diaphragm seal having a circumference and a peripheral edge margin extending about the circumference of the seal, the diaphragm seal comprising a flange including the peripheral edge margin and a central portion offset from the flange, wherein the peripheral edge margin of the diaphragm seal is engageable with an edge of the container defining the open top of the container, the lid assembly and the seal being configured such that upon assembly of the lid assembly, the seal and the container, a circumferential portion of the peripheral edge margin of the seal is flexible between a closed position in which said circumferential portion of the peripheral edge margin blocks the flow of liquid from the interior space of the container to the spout, and an open position in which liquid is permitted to flow over said circumferential portion of the peripheral edge margin for subsequent flow to the spout, another circumferential portion of the peripheral edge margin of the seal being retained against movement to said open position, wherein the lid assembly and diaphragm seal as installed on the cup define a vacuum chamber therebetween in communication with the peripheral edge margin of the seal about substantially the entire circumference of the seal, the retainer having an air passage defined therein for communication of air from the exterior to the interior of the container, the diaphragm seal being adapted to releasably seal with the retainer to block communication of the air passage with the interior of the container, the diaphragm seal being adapted to resiliently flex upon detection of vacuum pressure in the container to unblock the air passage and permit air to flow through the air passage to the interior of the container.

* * * * *

UNITED STATES PATENT AND TRADEMARK OFFICE
CERTIFICATE OF CORRECTION

PATENT NO. : 7,575,126 B2  Page 1 of 1
APPLICATION NO. : 11/046288
DATED : August 18, 2009
INVENTOR(S) : Bernard J. Kemper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Seventh Day of September, 2010

David J. Kappos
*Director of the United States Patent and Trademark Office*